US011625960B2

(12) United States Patent
DeLong et al.

(10) Patent No.: US 11,625,960 B2
(45) Date of Patent: Apr. 11, 2023

(54) VEHICLE POWER MANAGEMENT

(71) Applicant: Ford Global Technologies, LLC, Dearborn, MI (US)

(72) Inventors: Aaron Matthew DeLong, Toledo, OH (US); John Robert Van Wiemeersch, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 245 days.

(21) Appl. No.: 17/228,971

(22) Filed: Apr. 13, 2021

(65) Prior Publication Data
US 2022/0327872 A1 Oct. 13, 2022

(51) Int. Cl.
*G07C 5/08* (2006.01)
*B60R 16/033* (2006.01)

(52) U.S. Cl.
CPC .......... *G07C 5/0808* (2013.01); *B60R 16/033* (2013.01)

(58) Field of Classification Search
CPC ...... G07C 5/0808; B60R 16/033; B60R 16/03
See application file for complete search history.

(56) References Cited

U.S. PATENT DOCUMENTS

| | | | |
|---|---|---|---|
| 6,351,703 B1 | 2/2002 | Avery, Jr. | |
| 7,542,827 B2 | 6/2009 | Gerard et al. | |
| 7,647,908 B1 * | 1/2010 | Biondo | F02D 28/00 |
| | | | 123/179.2 |
| 8,410,929 B2 | 4/2013 | Flick et al. | |
| 8,907,620 B2 | 12/2014 | Van Wiemeersch | |
| 10,167,836 B2 * | 1/2019 | Holub | H02J 7/1438 |
| 10,294,874 B2 * | 5/2019 | Styles | F02D 41/0065 |
| 2011/0163721 A1 * | 7/2011 | Van Wiemeersch | |
| | | | B60R 16/033 |
| | | | 320/128 |
| 2014/0379174 A1 * | 12/2014 | Holub | B60R 16/033 |
| | | | 701/2 |
| 2017/0320482 A1 * | 11/2017 | Leone | F02M 26/36 |
| 2018/0003142 A1 * | 1/2018 | Holub | F02N 11/0862 |
| 2018/0215345 A1 * | 8/2018 | Elangovan | B60R 25/209 |
| 2018/0340502 A1 * | 11/2018 | Boulais | F02N 11/0807 |
| 2021/0362664 A1 * | 11/2021 | Yang | H04W 4/48 |
| 2022/0250583 A1 * | 8/2022 | Garg | B60R 25/102 |

FOREIGN PATENT DOCUMENTS

| | | | | |
|---|---|---|---|---|
| FR | 3100196 A1 * | 3/2021 | ............ | B60W 10/06 |
| WO | WO-2017198560 A1 * | 11/2017 | ............... | B60K 6/48 |

* cited by examiner

*Primary Examiner* — Joseph J Dallo
(74) *Attorney, Agent, or Firm* — Frank Lollo; Bejin Bieneman PLC

(57) ABSTRACT

Upon deactivating a vehicle, first operating data are collected, the first operating data including a measure of operation of a vehicle component other than a battery of the vehicle. Upon determining that a charge level of the battery of the vehicle is below a charge threshold, second operating data are collected from the vehicle component. Upon determining that the vehicle is unmoved from a location at which the vehicle was deactivated by determining that second operating data are within a threshold of the first operating data, a propulsion system is actuated to charge the battery.

20 Claims, 3 Drawing Sheets

VEHICLE POWER MANAGEMENT

BACKGROUND

Vehicles can use a battery and an internal combustion engine to power vehicle components, including, e.g., a powertrain, a steering rack, etc., during vehicle operation. For example, sensors that collect data while operating, including radar, LIDAR, vision systems, infrared systems, and ultrasonic transducers, consume energy from the battery. When the vehicle is deactivated, one or more components can remain activated, drawing power from the battery that may then be unavailable to reactivate the vehicle.

DETAILED DESCRIPTION

Figure 1:
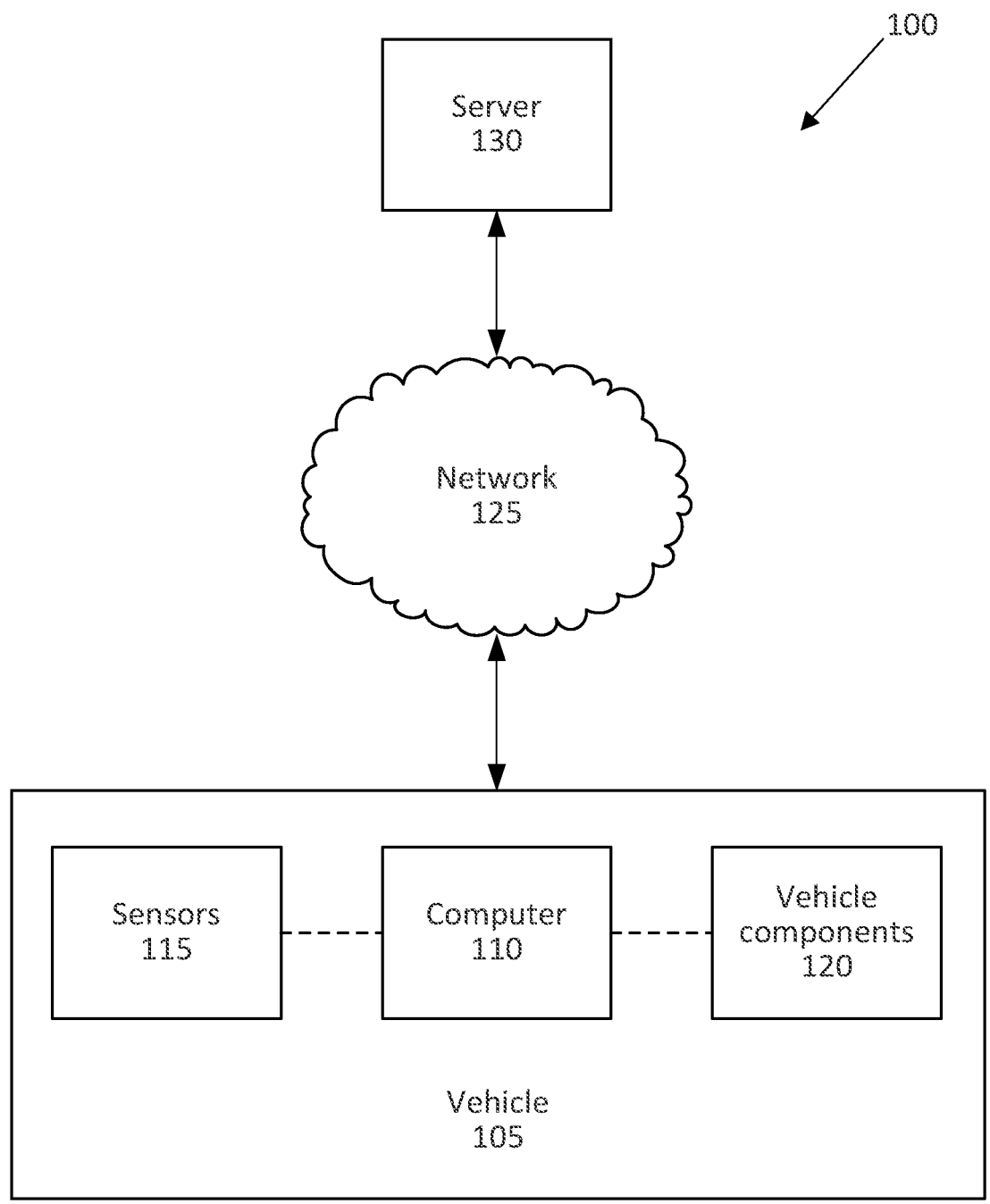
FIG. 1 is a block diagram of a system for managing a battery of a vehicle.

A system includes a computer including a processor and a memory, the memory storing instructions executable by the processor to, upon deactivating a vehicle, collect first operating data including a measure of operation of a vehicle component other than a battery of the vehicle, then, upon determining that a charge level of the battery of the vehicle is below a charge threshold, collect second operating data from the vehicle component, and upon determining that the that the vehicle is unmoved from a location at which the vehicle was deactivated by determining that second operating data are within a threshold of the first operating data, actuate a propulsion system to charge the battery.

The instructions can further include instructions to collect second operating data from each of a plurality of vehicle components and to actuate the propulsion system when the second operating data from two or more of the vehicle components exceed respective thresholds.

The instructions can further include instructions to, upon deactivating the vehicle, receive user input to monitor the charge level of the battery and, upon receiving the user input, to collect the first operating data from the vehicle component.

The instructions can further include instructions to determine that a current location of the vehicle is a different location than the location at which the vehicle was deactivated based on the second operating data and, then, to suppress actuation of the propulsion system to charge the battery.

The instructions can further include instructions to, upon determining that the current location of the vehicle is different than the location at which the vehicle was deactivated, request user input to actuate the propulsion to charge the battery.

The threshold can be based on a resolution of a sensor collecting operating data from the vehicle component.

The vehicle component can be a steering wheel and the operating data can be steering wheel angle data.

The vehicle component can be a vehicle seat and the operating data can be seat position data.

The vehicle component can be a door and the operating data can be door status data.

The instructions can further include instructions to, upon determining that the charge level of the battery exceeds a second charge threshold, deactivate the propulsion system.

The instructions can further include instructions to determine an inclination of the vehicle based on the operating data, to determine a second inclination of the vehicle based on the second operating data, and to suppress actuation of the propulsion system to charge the battery when a difference between the second inclination and the inclination is greater than a threshold.

The instructions can further include instructions to, based on the second operating data, request user input to actuate the propulsion system to charge the battery.

The instructions can further include instructions to, upon receiving user input to activate the vehicle, cease collection of the second operating data.

A method includes, upon deactivating a vehicle, collecting first operating data including a measure of operation of a vehicle component other than a battery of the vehicle, then, upon determining that a charge level of the battery of the vehicle is below a charge threshold, collecting second operating data from the vehicle component, and, upon determining that the that the vehicle is unmoved from a location at which the vehicle was deactivated by determining that second operating data are within a threshold of the first operating data, actuating a propulsion system to charge the battery.

The method can further include collecting second operating data from each of a plurality of vehicle components and actuating the propulsion system when the second operating data from two or more of the vehicle components exceed respective thresholds.

The method can further include, upon deactivating the vehicle, receiving user input to monitor the charge level of the battery and, upon receiving the user input, collecting the first operating data from the vehicle component.

The method can further include determining that a current location of the vehicle is a different location than the location at which the vehicle was deactivated based on the second operating data and, then, suppressing actuation of the propulsion system to charge the battery.

The method can further include, upon determining that the current location of the vehicle is different than the location at which the vehicle was deactivated, requesting user input to actuate the propulsion to charge the battery.

The method can further include, upon determining that the charge level of the battery exceeds a second charge threshold, deactivating the propulsion system.

The method can further include determining an inclination of the vehicle based on the operating data, determining a second inclination of the vehicle based on the second operating data, and suppressing actuation of the propulsion system to charge the battery when a difference between the second inclination and the inclination is greater than a threshold.

The method can further include, based on the second operating data, requesting user input to actuate the propulsion system to charge the battery.

The method can further include, upon receiving user input to activate the vehicle, ceasing collection of the second operating data.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

To maintain a charge level of a battery to enable reactivation of a deactivated vehicle, a computer can actuate a propulsion system, such as an internal combustion engine, to restore or augment electric charge. A user of the vehicle can select a location at which to deactivate the vehicle that allows for the computer to actuate the propulsion in order to restore the charge level of the battery. Such a location can be, e.g., a dedicated parking area. The vehicle may be moved prior to reactivation to a different location at which actuation of the propulsion may not be permitted. For example, the vehicle may be towed from an outdoor parking area to an enclosed garage. When the vehicle has moved, the computer can suppress actuation of the propulsion subsystem. Thus, the computer can restore the charge level of the battery upon determining that the vehicle remains at the same location at which the user deactivated the vehicle, recharging the battery according to instructions provided by the user to the computer.

To determine whether the vehicle has moved from the location at which the vehicle was deactivated, the computer can compare operating data from one or more components from deactivation to a time at which the charge level of the battery is below a charge threshold. The operating data are measures of operation of the components, e.g., a steering wheel angle, a door position, etc. When the operating data at the time of deactivation are the same as operating data when the charge level of the battery is below the charge threshold, the computer can determine that the vehicle has not moved and can actuate the propulsion subsystem to restore the charge level of the battery. When the operating data at the time of deactivation differ from operating data when the charge level of the battery is below the charge threshold, the computer can determine that the vehicle has moved and can suppress actuation of the propulsion. Thus, the computer can maintain the charge level of the battery while at a location at which actuation of the propulsion subsystem is permitted and suppress the propulsion when moved to a location at which actuation of the propulsion subsystem may not be permitted.

FIG. 1 illustrates an example system 100 for managing a charge level of a battery of a vehicle 105. A computer 110 in the vehicle 105 is programmed to receive collected data from one or more sensors 115. For example, vehicle 105 data may include a location of the vehicle 105, data about an environment around a vehicle, data about an object outside the vehicle such as another vehicle, etc. A vehicle 105 location is typically provided in a conventional form, e.g., geo-coordinates such as latitude and longitude coordinates obtained via a navigation system that uses the Global Positioning System (GPS). Further examples of data can include measurements of vehicle 105 systems and components, e.g., a vehicle 105 velocity, a vehicle 105 trajectory, etc.

The computer 110 is generally programmed for communications on a vehicle 105 network, e.g., including a conventional vehicle 105 communications bus such as a CAN bus, LIN bus, etc., and or other wired and/or wireless technologies, e.g., Ethernet, WIFI, etc. Via the network, bus, and/or other wired or wireless mechanisms (e.g., a wired or wireless local area network in the vehicle 105), the computer 110 may transmit messages to various devices in a vehicle 105 and/or receive messages from the various devices, e.g., controllers, actuators, sensors, etc., including sensors 115. Alternatively, or additionally, in cases where the computer 110 actually comprises multiple devices, the vehicle network may be used for communications between devices represented as the computer 110 in this disclosure. For example, the computer 110 can be a generic computer with a processor and memory as described above and/or may include an electronic control unit (ECU) or controller or the like for a specific function or set of functions, and/or a dedicated electronic circuit including an ASIC that is manufactured for a particular operation, e.g., an ASIC for processing sensor data and/or communicating the sensor data. In another example, computer 110 may include an FPGA (Field-Programmable Gate Array) which is an integrated circuit manufactured to be configurable by an occupant. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in computer 110.

In addition, the computer 110 may be programmed for communicating with the network 125, which, as described below, may include various wired and/or wireless networking technologies, e.g., cellular, Bluetooth®, Bluetooth® Low Energy (BLE), Ultra-Wideband (UWB), WiFi, wired and/or wireless packet networks, etc.

The memory can be of any type, e.g., hard disk drives, solid state drives, servers, or any volatile or non-volatile media. The memory can store the collected data sent from the sensors 115. The memory can be a separate device from the computer 110, and the computer 110 can retrieve information stored by the memory via a network in the vehicle 105, e.g., over a CAN bus, a wireless network, etc. Alternatively, or additionally, the memory can be part of the computer 110, e.g., as a memory of the computer 110.

Sensors 115 can include a variety of devices. For example, various controllers in a vehicle 105 may operate as sensors 115 to provide data via the vehicle 105 network or bus, e.g., data relating to vehicle speed, acceleration, location, subsystem and/or component status, etc. Further, other sensors 115 could include cameras, motion detectors, etc., i.e., sensors 115 to provide data for evaluating a position of a component, evaluating a slope of a roadway, etc. The sensors 115 could, without limitation, also include short range radar, long range radar, LIDAR, and/or ultrasonic transducers.

Collected data can include a variety of data collected in a vehicle 105. Examples of collected data are provided above, and moreover, data are generally collected using one or more sensors 115, and may additionally include data calculated therefrom in the computer 110, and/or at the server 130. In general, collected data may include any data that may be gathered by the sensors 115 and/or computed from such data.

The vehicle 105 can include a plurality of vehicle components 120. In this context, each vehicle component 120 includes one or more hardware components adapted to perform a mechanical function or operation—such as moving the vehicle 105, slowing or stopping the vehicle 105, steering the vehicle 105, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like. Components 120 can include computing devices, e.g., electronic control units (ECUs) or the like and/or computing devices such as described above with respect to the computer 110, and that likewise communicate via a vehicle 105 network.

The system 100 can further include a network 125 connected to a server 130. The computer 110 can further be programmed to communicate with one or more remote sites such as the server 130, via the network 125, such remote site possibly including a processor and a memory. The network 125 represents one or more mechanisms by which a vehicle computer 110 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The vehicle 105 includes a battery 135. The battery 135 provides electricity to the computer 110, the sensors 115, and one or more of the components 120. The battery 135 can be, e.g., a lead-acid battery, a nickel-metal-hydride battery, a lithium-ion battery, a fuel cell, etc. The battery 135 provides power to "activate" the vehicle 105, i.e., to actuate a propulsion and power components 120 to prepare the vehicle 105 to move. The battery 135 can provide power to one or more components 120 to move the vehicle 105, e.g., when a propulsion system 120 is a hybrid system including an internal combustion engine and an electric motor.

Figure 2:
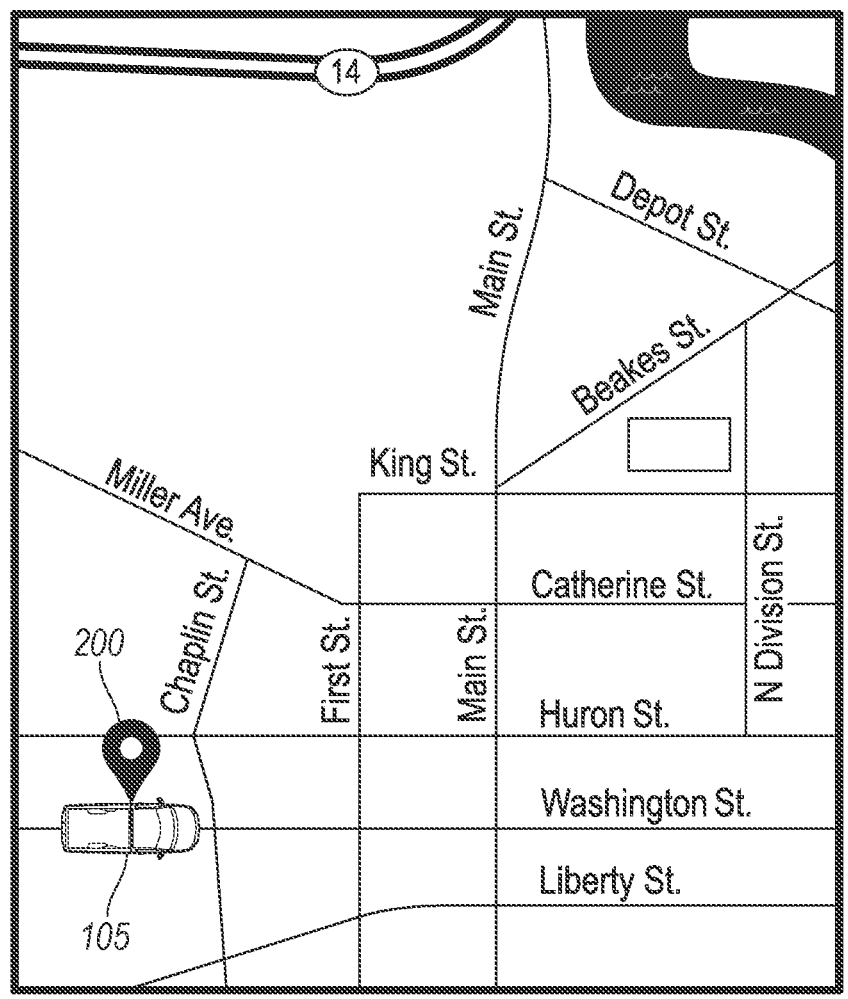
FIG. 2 is a view of the vehicle deactivated at a location.

FIG. 2 is a view of a vehicle 105 that is deactivated at a location 200. A user of the vehicle 105 can deactivate the vehicle 105 at, e.g., a parking garage, a parking lot, a parking space on a street, etc. The computer 110 can determine that the vehicle 105 has been deactivated by collecting data from one or more components 120. For example, the computer 110 can determine that the vehicle 105 is deactivated when a propulsion system 120 is powered off. In another example, the computer 110 can determine that the vehicle 105 is deactivated when a position of a transmission gear is "parked."

A battery 135 of the vehicle 105 can lose charge as the vehicle 105 remains deactivated at the location 200. To preserve a charge level of the battery 135 to reactivate the vehicle 105, a computer 110 can actuate a propulsion system 120, such as an internal combustion engine, to restore charge to the battery 135 when the charge level falls below a charge threshold. That is, the propulsion system 120 (e.g., an internal combustion engine) can rotate an alternator, providing electricity to increase the charge level of the battery 135. The computer 110 can determine to actuate the propulsion system 120 when the current location of the vehicle 105 at a time at which the charge level of the battery 135 falls below the threshold is a same location as the location 200, i.e., the location at which the vehicle 105 was deactivated. That is, the user can provide input indicating that the location 200 is a location at which actuating the propulsion system 120 to recharge the battery 135 is permitted. If the vehicle 105 has moved since deactivation, e.g., by towing or rolling, the vehicle 105 may not be in a location at which actuation of the propulsion system 120 may be permitted. Thus, the computer 110 can determine only to actuate the propulsion system 120 to recharge the battery 135 when the vehicle 105 is still at the location 200 at which the vehicle 105 was deactivated.

To determine whether the vehicle 105 has moved, the computer 110 can collect operating data from one or more vehicle components 120. In this context, "operating data" are a measure of operation of a vehicle component 120 other than the battery 135. The computer 110 can actuate one or more sensors 115 to collect the operating data. The operating data can include, as non-limiting examples, data shown in Table 1 below for specified vehicle components 120:

| Component | Sensor | Operating Data |
| --- | --- | --- |
| Steering wheel | Steering wheel angle sensor | Steering wheel angle (degrees) |
| Transmission gear | Transmission controller | Gear position |
| Tire | Tire pressure sensor | Tire rotational position (psi) |
| Door | Hall effect sensor | Door position (open or closed) |
| Hood | Hall effect sensor | Hood position (open or closed) |
| Seat | Seat controller | Seat position (coordinates relative to an origin, angle relative to a floor) |
| Park brake | Park brake controller | Park brake status (on or off) |
| Vehicle body | MEMS sensor | Vehicle inclination (degrees) |
| Vehicle body | IMU sensor | Vehicle orientation relative to a neutral position (degrees), e.g., true north |

Upon deactivating the vehicle 105, the computer 110 can receive user input to monitor the charge level of the battery 135. For example, the user can provide a haptic (i.e., a touch) input to a display screen in the vehicle 105. In another example, the user can provide input to a remote device, e.g., a smartphone or a tablet, and the remote device can transmit the user input to the computer 110 via the network 125. Upon receiving the user input, the computer 110 can collect the operating data from the vehicle components 120. The computer 110 can associate the collected operating data to the location 200. That is, the computer 110 can determine that, if operating data collected at a later time differ from the operating data associated to the location 200, then the vehicle 105 has moved from the location 200 and the computer 110 should not actuate the propulsion system 120 to recharge the battery 135. If the operating data collected at the later time are within a threshold as the operating data associated to the location 200, as described below, the computer 110 can determine that the vehicle 105 is unmoved from the location 200 and can actuate the propulsion system 120 to recharge the battery 135. The computer 110 can store the operating data in a memory. Alternatively, or additionally, the computer 110 can transmit the operating data to an external server 130 via a network 125.

The operating data can include an inclination of the vehicle 105, as shown in FIG. 1. The "inclination" is an angle defined between a longitudinal axis of the vehicle 105 and a reference plane, e.g., flat ground. The computer 110 can determine the inclination of the vehicle 105 based on data from a micro electromechanical system (MEMS) sensor 115. The MEMS sensor 115 can include a suspended mass between two capacitive plates, the suspended mass hanging freely in the direction of gravity. The inclination of the vehicle 105 moves the capacitive plates relative to the suspended mass, and the suspended mass induces a change in the capacitance of the capacitive plates. The computer 110 can determine the inclination of the vehicle 105 based on this change in capacitance with, e.g., a correlation equation, lookup table, or the like. The computer 110 can determine an inclination of the vehicle 105 from the MEMS sensor 115 upon deactivation as the first operating data.

The computer 110 can collect charge level data from the battery 135. As described above, when the charge level of the battery 135 is below the charge threshold, the computer 110 can determine to actuate the propulsion system 120 to recharge the battery 135. As also described above, the computer 110 can determine to recharge the battery 135 when the vehicle 105 is unmoved from the location 200 at which the vehicle 105 deactivated. To determine whether the vehicle 105 is unmoved, when the computer 110 determines that the charge level of the battery 135 is below the charge threshold, the computer 110 can collect second operating data from the components 120. The computer 110 can collect the second operating data from the components 120 from which the computer 110 collected the operating data upon deactivating the vehicle 105, i.e., "first" operating data. For example, the computer 110 can determine a second inclination of the vehicle 105 from the MEMS sensor 115 as the second operating data, and the computer 110 can determine whether the first inclination and the second inclination differ by a threshold to determine whether the vehicle 105 moved from the location 200. Thus, the computer 110 can compare operating data from the same components 120 at different times to determine whether the vehicle 105 has moved from the location 200. When the computer 110 receives user input to activate the vehicle 105, the computer 110 can cease collection of the second operating data.

The computer 110 can compare first operating data and second operating data from one component 120 to determine whether the vehicle 105 is unmoved from the location 200. The computer 110 can compare the second operating data to the first operating data stored in the memory. Alternatively, the computer 110 can request the first operating data from the server 130 via the network 125. If a difference between the first and second operating data exceeds a threshold, the computer 110 can determine that the vehicle 105 has moved and can suppress actuation of the propulsion system 120 to recharge the battery 135. For example, the computer 110 can suppress actuation of the propulsion system 120 to charge the battery 135 when a difference between the second inclination and the inclination described above is greater than resolution of the MEMS sensor 115. The threshold can be determined based on empirical testing of test vehicles 105. The empirical testing can include collecting first test operating data from specified components 120 when the test vehicle 105 is stationary and then towing the test vehicle 105 a specified distance. That is, the test vehicle 105 is moved with, e.g., a tow truck, without activating the test vehicle 105. Then, second operating data are collected from the specified components 120 and compared to the first operating data. When respective first and second operating data differ for one of the components 120, the difference between the first and second operating data is the threshold for the operating data for that component 120. If the first and second operating data for one of the components 120 is the same, the test vehicle 105 is moved another specified distance and third operating data is collected from the components 120 that have not defined a threshold yet. Then, when respective first and third operating data differ for one of the remaining components 120, the respective threshold for operating data for those components 120 is the difference between the first and third operating data. The test vehicle 105 can be moved successive distances until thresholds are established for all components 120. When the difference between the first and second operating data is below the threshold, the computer 110 can determine that the vehicle 105 is unmoved from the location 200 and actuate the propulsion system 120 to recharge the battery 135.

The computer 110 can collect first and second operating data from a plurality of components 120, and when respective differences between first and second operating data from two or more of the vehicle components 120 exceed respective thresholds, the computer 110 can determine that the vehicle 105 has moved from the location 200. For example, the computer 110 can collect first and second operating data from each of a steering wheel, a seat, and a door, i.e., a steering wheel angle, a seat position, and a door status. When respective first and second operating data of at least two of the steering wheel angle, the seat position, and the door status exceed respective thresholds, the computer 110 can determine that the vehicle 105 has moved from the location 200. The computer 110 can collect first operating data from a preselected list of components 120 stored in the memory, the list of components 120 selected by, e.g., a manufacturer. For example, the list of components 120 can be components 120 for which thresholds were determined upon collecting second operating data described in empirical testing above, i.e., the first components 120 for which operating data differed from the first operating data upon movement of the test vehicle 105. Alternatively, the computer 110 can collect first operating data from all components 120 that can provide the operating data to the computer 110 at the time of deactivation of the vehicle 105. Then, upon determining that the charge level of the battery 135 is below the charge threshold, the computer 110 can collect second operating data from all components 120 that can provide the second operating data to the computer 110 at that time. The computer 110 can compare data from components 120 that provided both first and second operating data to determine whether the vehicle 105 has moved from the location 200. Additionally or alternatively, the computer 110 can use a suitable data fusion technique to fuse the first and second operating data and to compare the fused data to a threshold determined based on, e.g., empirical testing described above.

Upon determining that the vehicle 105 has moved from the location 200 based on the second operating data, the computer 110 can request user input to actuate the propulsion system 120 to charge the battery 135. When the vehicle 105 has moved from the location 200, the vehicle 105 may be at a location at which actuation of the propulsion system 120 is not permitted, so the computer 110 can initially determine not to actuate the propulsion system 120 to recharge the battery 135. The computer 110 can request user input asking whether the current location of the vehicle 105 is a location at which actuation would be permitted. That is, the user may provide authorization for the computer 110 to actuate the propulsion system 120 to recharge the battery 135 at the current location of the vehicle 105. The user can provide the user input via, e.g., a display screen in the vehicle 105, a remote device such as a smartphone or a tablet, etc. If the computer 110 receives user input providing authorization, the computer 110 actuates the propulsion system 120 to recharge the battery 135. Otherwise, the computer 110 suppresses actuation of the propulsion system 120.

Figure 3:
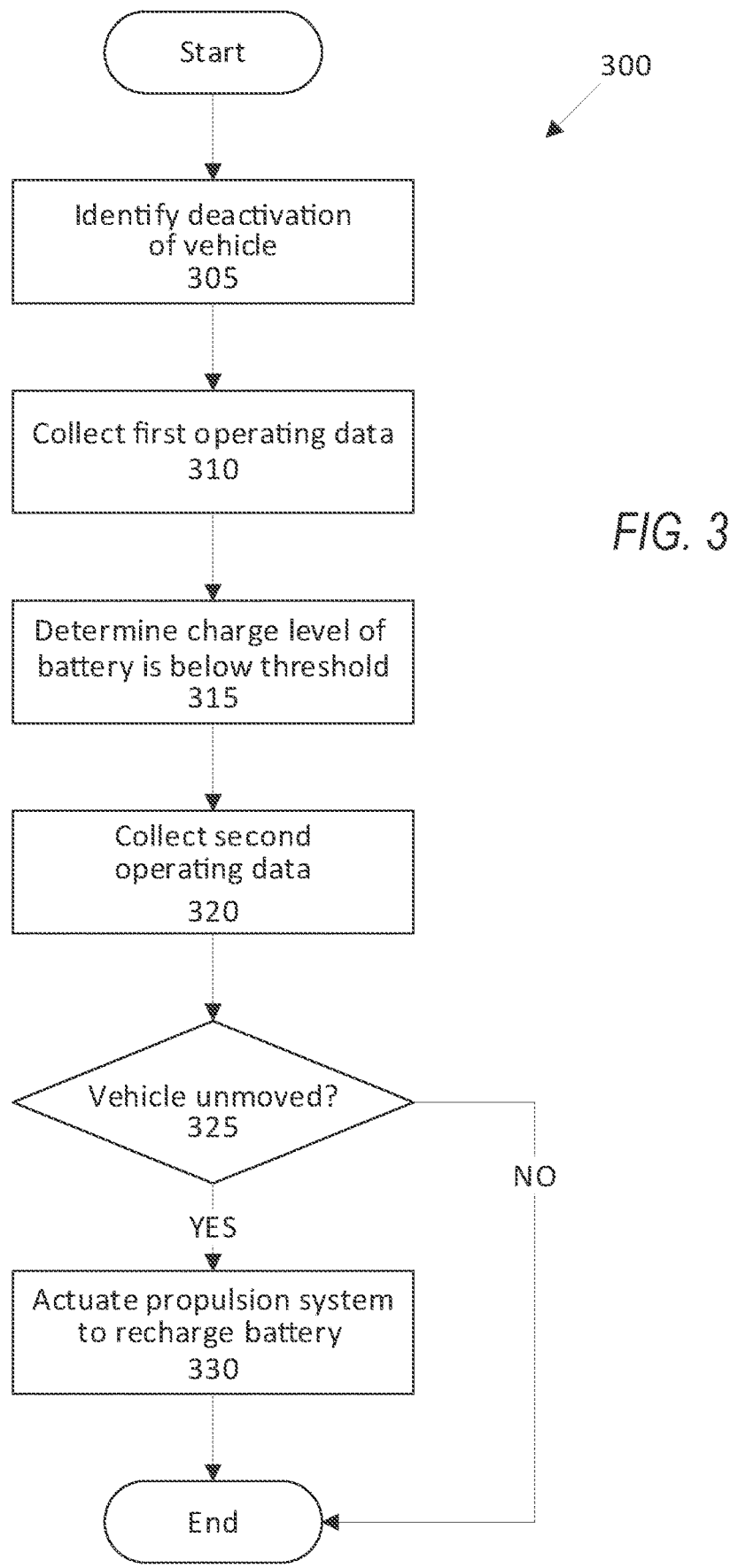
FIG. 3 is a block diagram of an example process for managing the battery of the vehicle.

FIG. 3 is a block diagram of an example process 300 to recharge a battery 135 of a vehicle 105. The process 300 begins in a block 305, in which a computer 110 identifies a deactivation of the vehicle 105. As described above, the computer 110 can determine that the vehicle 105 has been deactivated when a propulsion system 120 has been deactivated and a transmission gear is in a "parked" position.

Next, in a block 310, the computer 110 collects first operating data from one or more components 120. As described above, the operating data are data describing a parameter of operation of one or more of the components 120. For example, the component 120 can be a steering wheel, and the operating data can be a steering wheel angle. The computer 110 can actuate a steering wheel angle sensor 115 to collect the steering wheel angle data. In another example, the component 120 can be a vehicle seat, and the operating data can be a seat position. The computer 110 can actuate a seat position sensor 115 to collect the seat position data. The computer 110 can store the collected first operating data in a memory.

Next, in a block 315, the computer 110 determines that a charge level of the battery 135 is below a charge threshold. As described above, when the vehicle 105 is deactivated, the battery 135 can lose charge, and the charge threshold can be a minimum amount of charge to reactivate the vehicle 105. While the vehicle 105 is deactivated, the computer 110 can collect charge level data of the battery 135 to monitor the charge level of the battery 135.

Next, in a block 320, the computer 110 collects second operating data from the one or more components 120 from which the computer 110 collected the first operating data. As described above, the computer 110 collects the second operating data from the components from which the first operating data were collected to compare the first operating data to the second operating data. For example, if the first operating data are steering wheel angle data, the computer 110 can collect second operating data from the steering wheel.

Next, in a block 325, the computer 110 determines whether the vehicle 105 is unmoved from a location 200 at which the vehicle 105 deactivated. As described above, when the vehicle 105 has been moved from the location 200 at which the vehicle 105 deactivated, the vehicle 105 may be at a location at which operating the propulsion may not be permitted. The computer 110 determines that the vehicle 105 is unmoved when the first operating data are within a threshold of the second operating data, as described above. The threshold can be, e.g., a resolution of the sensor 115 used to collect the first and second operating data. If the computer 110 determines that the vehicle 105 is unmoved, the process 300 continues in a block 330. Otherwise, the process 300 ends.

In the block 330, the computer 110 actuates the propulsion system 120 to recharge the battery 135. As described above, an internal combustion engine of the propulsion system 120 can rotate an alternator that generates electricity to recharge the battery 135. The computer 110 can actuate the propulsion system 120 to restore the charge level of the battery above the charge threshold. Following the block 330, the process 300 ends.

Computing devices discussed herein, including the computer 110, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 110 is generally a collection of data stored on a computer readable medium, such as a storage medium, a random-access memory, etc.

A computer readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 300, one or more of the steps could be omitted, or the steps could be executed in a different order than shown in FIG. 3. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

Ordinal adjectives such as "first" and "second" are used throughout this document as identifiers and are not intended to signify importance or order.

The invention claimed is:

1. A system, comprising a computer including a processor and a memory, the memory storing instructions executable by the processor to:
   upon deactivating a vehicle, collect first operating data including a measure of operation of a vehicle component other than a battery of the vehicle;
   then, upon determining that a charge level of the battery of the vehicle is below a charge threshold, collect second operating data from the vehicle component; and
   upon determining that the vehicle is unmoved from a location at which the vehicle was deactivated by determining that second operating data are within a threshold of the first operating data, actuate a propulsion system to charge the battery.

2. The system of claim 1, wherein the instructions further include instructions to collect second operating data from each of a plurality of vehicle components and to actuate the propulsion system when the second operating data from two or more of the vehicle components exceed respective thresholds.

3. The system of claim 1, wherein the instructions further include instructions to, upon deactivating the vehicle, receive user input to monitor the charge level of the battery and, upon receiving the user input, to collect the first operating data from the vehicle component.

4. The system of claim 1, wherein the instructions further include instructions to determine that a current location of the vehicle is a different location than the location at which the vehicle was deactivated based on the second operating data and, then, to suppress actuation of the propulsion system to charge the battery.

5. The system of claim 4, wherein the instructions further include instructions to, upon determining that the current location of the vehicle is different than the location at which the vehicle was deactivated, request user input to actuate the propulsion system to charge the battery.

6. The system of claim 1, wherein the threshold is based on a resolution of a sensor collecting operating data from the vehicle component.

7. The system of claim 1, wherein the vehicle component is a steering wheel and the operating data are steering wheel angle data.

8. The system of claim 1, wherein the vehicle component is a vehicle seat and the operating data are seat position data.

9. The system of claim 1, wherein the vehicle component is a door and the operating data are door status data.

10. The system of claim 1, wherein the instructions further include instructions to, upon determining that the charge level of the battery exceeds a second charge threshold, deactivate the propulsion system.

11. The system of claim 1, wherein the instructions further include instructions to determine an inclination of the vehicle based on the operating data, to determine a second inclination of the vehicle based on the second operating data, and to suppress actuation of the propulsion system to charge the battery when a difference between the second inclination and the inclination is greater than a threshold.

12. The system of claim 1, wherein the instructions further include instructions to, based on the second operating data, request user input to actuate the propulsion system to charge the battery.

13. The system of claim 1, wherein the instructions further include instructions to, upon receiving user input to activate the vehicle, cease collection of the second operating data.

14. A method, comprising:
   upon deactivating a vehicle, collecting first operating data including a measure of operation of a vehicle component other than a battery of the vehicle;
   then, upon determining that a charge level of the battery of the vehicle is below a charge threshold, collecting second operating data from the vehicle component; and
   upon determining that the vehicle is unmoved from a location at which the vehicle was deactivated by determining that second operating data are within a threshold of the first operating data, actuating a propulsion system to charge the battery.

15. The method of claim 14, further comprising collecting second operating data from each of a plurality of vehicle components and actuating the propulsion system when the second operating data from two or more of the vehicle components exceed respective thresholds.

16. The method of claim 14, further comprising, upon deactivating the vehicle, receiving user input to monitor the charge level of the battery and, upon receiving the user input, collecting the first operating data from the vehicle component.

17. The method of claim 14, further comprising determining that a current location of the vehicle is a different location than the location at which the vehicle was deactivated based on the second operating data and, then, suppressing actuation of the propulsion system to charge the battery.

18. The method of claim 14, wherein the threshold is based on a resolution of a sensor collecting operating data from the vehicle component.

19. The method of claim 14, further comprising, upon determining that the charge level of the battery exceeds a second charge threshold, deactivating the propulsion system.

20. The method of claim 14, further comprising determining an inclination of the vehicle based on the operating data, determining a second inclination of the vehicle based on the second operating data, and suppressing actuation of the propulsion system to charge the battery when a difference between the second inclination and the inclination is greater than a threshold.

* * * * *